(12) United States Patent
Xia

(10) Patent No.: US 10,976,485 B2
(45) Date of Patent: Apr. 13, 2021

(54) BACKLIGHT STRUCTURE AND MANUFACTURING METHOD THEREOF, DISPLAY DEVICE AND MOBILE TERMINAL

(71) Applicants: HEFEI BOE DISPLAY LIGHTING CO., LTD., Anhui (CN); BOE TECHNOLOGY GROUP CO., LTD., Beijing (CN)

(72) Inventor: Xiaoli Xia, Beijing (CN)

(73) Assignees: HEFEI BOE DISPLAY LIGHTING CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 54 days.

(21) Appl. No.: 16/491,977

(22) PCT Filed: Apr. 26, 2019

(86) PCT No.: PCT/CN2019/084621
§ 371 (c)(1),
(2) Date: Sep. 6, 2019

(87) PCT Pub. No.: WO2019/218860
PCT Pub. Date: Nov. 21, 2019

(65) Prior Publication Data
US 2020/0073048 A1 Mar. 5, 2020

(30) Foreign Application Priority Data
May 14, 2018 (CN) .......................... 201820715103.X

(51) Int. Cl.
*F21V 8/00* (2006.01)

(52) U.S. Cl.
CPC ......... *G02B 6/0088* (2013.01); *G02B 6/0055* (2013.01)

(58) Field of Classification Search
CPC ........................... G02B 6/0088; G02B 6/0055
See application file for complete search history.

(56) References Cited

U.S. PATENT DOCUMENTS

| 6,147,724 A | * | 11/2000 | Yoshii | G02B 6/0083 349/62 |
| 2016/0131827 A1 | * | 5/2016 | Lee | G02F 1/133308 349/58 |
| 2018/0205809 A1 | * | 7/2018 | Luo | H04M 1/0266 |

FOREIGN PATENT DOCUMENTS

| CN | 203322880 U | 12/2013 |
| CN | 203641994 U | 6/2014 |

(Continued)

*Primary Examiner* — Mary Ellen Bowman

(57) ABSTRACT

A backlight structure, a manufacturing method thereof, a display device and a mobile terminal are provided. The backlight structure includes a frame and a light shading member, the frame includes a main body, a first bending portion and a second bending portion, the first bending portion protrudes from the main body in a first direction, the second bending portion protrudes from the main body in a second direction, the first direction is opposite to the second direction, the second bending portion is located between two adjacent first bending portions. The frame further includes a hollow portion, the hollow portion is located between the two adjacent first bending portions and further extends to a position where the second bending portion intersects with the main body, and the light shading member is located within the hollow portion.

20 Claims, 9 Drawing Sheets

(56) References Cited

FOREIGN PATENT DOCUMENTS

| | | |
|---|---|---|
| CN | 203980161 U | 12/2014 |
| CN | 205809782 U | 12/2016 |
| CN | 208110217 U | 11/2018 |
| KR | 20150037232 A | 4/2015 |
| TW | 201329564 A | 7/2013 |

* cited by examiner

BACKLIGHT STRUCTURE AND MANUFACTURING METHOD THEREOF, DISPLAY DEVICE AND MOBILE TERMINAL

CROSS-REFERENCE TO RELEVANT APPLICATION

This application claims the benefit of priority from Chinese patent application No. 201820715103.X, filed on May 14, 2018, the disclosure of which is incorporated herein in its entirety by reference as a part of this application.

TECHNICAL FIELD

Embodiments of the present disclosure relate to a backlight structure and a manufacturing method thereof, a display device and a mobile terminal.

BACKGROUND

With development and progress of science and technology, mobile phones have become indispensable electronic equipment in people's lives. Due to the competition in the market and the promotion of people's requirements for mobile phones, ultra-thin and narrow-border mobile phones have become the mainstream trend of mobile phone market at present. A greater screen-to-body ratio of mobile phones will bring better visual effect and experience to consumers.

SUMMARY

The embodiments of the present disclosure provide a backlight structure comprising a frame and a light shading member. The frame comprises a main body, a first bending portion and a second bending portion, the first bending portion protrudes from the main body in a first direction, the second bending portion protrudes from the main body in a second direction, the first direction is opposite to the second direction, the second bending portion is located between two adjacent first bending portions, the frame further comprises a hollow portion, the hollow portion is located between the two adjacent first bending portions and further extends to a position where the second bending portion intersects with the main body, and the light shading member is located within the hollow portion.

For example, a portion of the hollow portion is located within a plane in which the main body is located, so that the position where the second bending portion intersects with the main body is recessed into an inner side of the main body as compared to a position where the two adjacent first bending portions intersect with the main body.

For example, a portion of the light shading member is located within the plane in which the main body is located and is flush with the main body in the first direction and the second direction, respectively.

For example, the portion of the light shading member located within the plane in which the main body is located extends to the position where the second bending portion intersects with the main body.

For example, the backlight structure further comprises a reflective plate disposed on the main body and a light guide plate disposed on the reflective plate in the first direction. A gap is between the portion of the light shading member located within the plane in which the main body is located and the position where the second bending portion intersects with the main body, the gap is a part of the hollow portion, and the gap is covered by the reflective plate.

For example, a portion of the light shading member is located between the two adjacent first bending portions, and is flush with the two adjacent first bending portions in the first direction.

For example, a thickness of the portion of the light shading member located between the two adjacent first bending portions is substantially equal to a thickness of the two adjacent first bending portions.

For example, each of the first direction and the second direction is substantially perpendicular to the main body.

For example, a length of the second bending portion in the second direction is greater than a length of the first bending portion in the first direction.

For example, an end, facing away from the main body, of the second bending portion, is provided with an opening or a protrusion.

For example, the frame is of a rectangle, and the two adjacent first bending portions and the second bending portion are arranged at at least one edge of the frame.

The embodiments of the present disclosure further provide a display device, comprising the backlight structure as described above, a display module and a shell. The display module is disposed on the backlight structure in the first direction, the shell includes a rear shell and a middle shell located on an inner side of the rear shell, the backlight structure is disposed on the middle shell in the first direction, and the second bending portion is fixed to the middle shell.

For example, the display device further comprises an adhesive layer. The rear shell includes a main body and a bending portion, the main body of the rear shell is parallel to the main body of the frame, the bending portion of the rear shell protrudes from the main body of the rear shell in the first direction, a first side of the adhesive layer is connected to the bending portion of the rear shell, a second side of the adhesive layer is connected to the light shading member, and the first side and the second side are opposite sides.

For example, the rear shell further includes a protruding portion protruding from the bending portion of the rear shell to an inner side of the display device, the protruding portion is parallel to the main body of the rear shell, and the second extension portion and the middle shell are separated from the protruding portion by a distance.

The embodiments of the present disclosure further provide a mobile terminal, comprising the display device as described above.

The embodiments of the present disclosure further provide a manufacturing method of a backlight structure, the backlight structure comprises a frame and a light shading member, the frame comprises a main body, a first bending portion, a second bending portion and a hollow portion. The method comprises: providing a sheet; bending a portion of the sheet in a first direction and bending another portion of the sheet in a second direction, so as to form the main body, the first bending portion, the second bending portion and the hollow portion, in which the first direction is opposite to the second direction, the first bending portion protrudes from the main body in the first direction, the second bending portion protrudes from the main body in the second direction, the second bending portion is located between two adjacent first bending portions, and the hollow portion is located between the two adjacent first bending portions and further extends to a position where the second bending portion intersects with the main body; and forming a light shading member within the hollow portion.

For example, the light shading member is a light shading adhesive, and the light shading member is filled into the hollow portion by injection molding.

For example, before the portion of the sheet is bent in the first direction and the another portion of the sheet is bent in the second direction, the method further comprises: cutting the sheet along a cutting line, in which the cutting line is located between the portion of the sheet and the another portion of the sheet.

For example, after the light shading member is filled into the hollow portion by injection molding, the method further comprises thinning the light shading member.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments of the disclosure will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the descriptions and claims of the present disclosure, expressions such as "first", "second" and the like do not denote any order, quantity, or importance, but rather are used for distinguishing different components. Expressions such as "include" or "comprise" and the like denote that elements or objects appearing before the words of "include" or "comprise" cover the elements or the objects enumerated after the words of "include" or "comprise" or equivalents thereof, not exclusive of other elements or objects. Expressions such as "connect" or "interconnect" and the like are not limited to physical or mechanical connections, but may include electrical connections, whether direct or indirect. Expressions such as "up", "down", "left", "right" and the like are only used for expressing relative positional relationship, the relative positional relationship may be correspondingly changed in the case that the absolute position of a described object is changed.

For example, a display device includes a shell, a liquid crystal display module and a back plate. The inventor of the present disclosure finds that there are still the following problems in the display device at present: 1) there is a larger distance between the shell and the liquid crystal display module, so that overall thickness of the display device is relatively large and the screen-to-body ratio is relatively small; 2) the light shading effect of the display device is relatively poor, and in particularly, the desired light shading effect cannot be achieved for a long time; 3) the back plate and the shell cannot be completely fixed, so that overall firmness of the display device is reduced.

Figure 1:
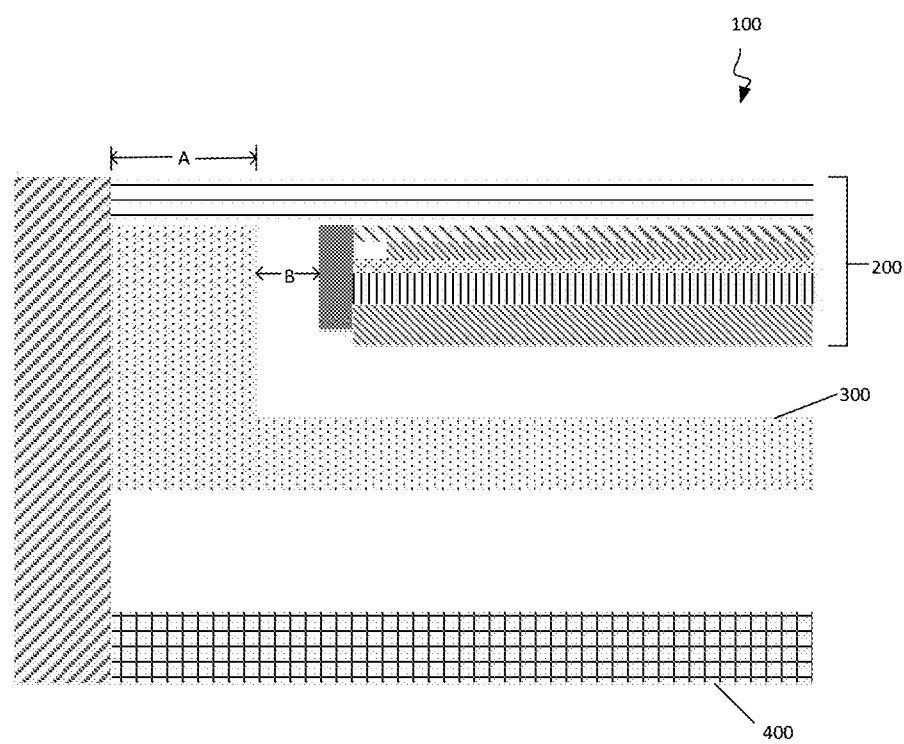
FIG. 1 is a schematic view illustrating a display device according to one technique.

FIG. 1 is a schematic view illustrating a display device. The display device 100 includes a shell and a liquid crystal display module 200 having a touch structure. The shell includes a middle shell 300 and a rear shell 400, the middle shell 300 is located on an inner side of the rear shell 400, and the middle shell 300 and the rear shell 400 are, for example, integral with each other. The rear shell 400 is arranged as an outermost shell of the display device 100, and thus is used for protecting all components within the display device 100. The liquid crystal display module 200 is arranged on an inner side of the middle shell 300, and the middle shell 300 and the liquid crystal display module 200 are fixedly connected to each other by a way of dispensing adhesive. A width A of a dispensed adhesive is approximately 0.8 mm and a gap B between the middle shell 300 and the liquid crystal display module 200 is approximately 0.3 mm, so that a distance between the middle shell 300 and the liquid crystal display module 200 is at least 1.1 mm. Because the distance of at least 1.1 mm occurs between the middle shell 300 and the liquid crystal display module 200, it is impossible for manufacturers to produce the display device that has a large screen-to-body ratio and is ultra-thin.

Figure 2:
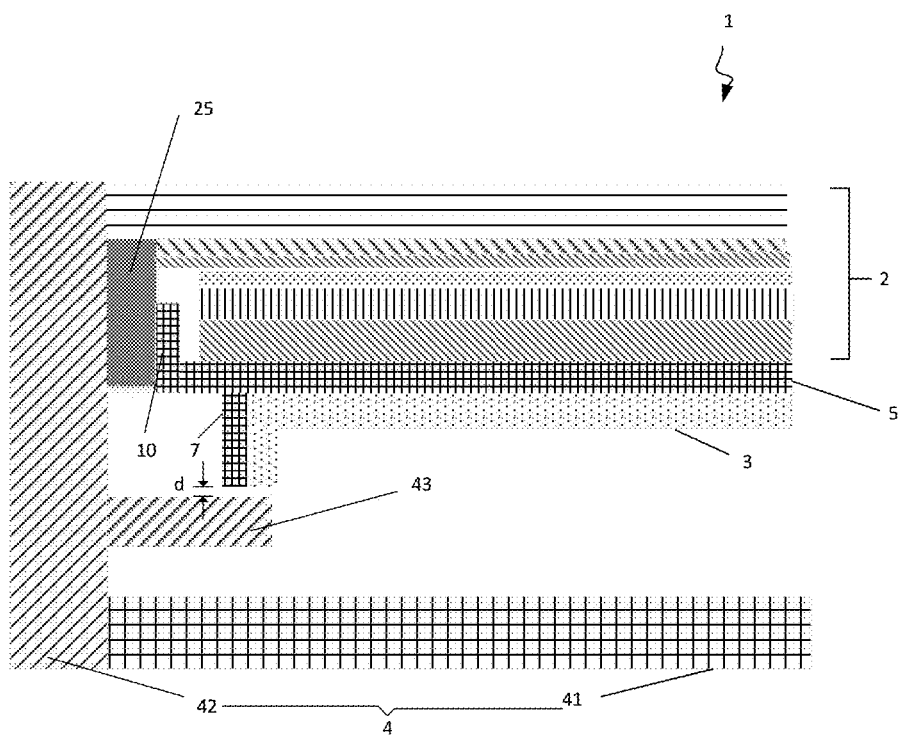
FIG. 2 is a structurally schematic view illustrating a display device according to embodiments of the present disclosure.
Figure 3A:
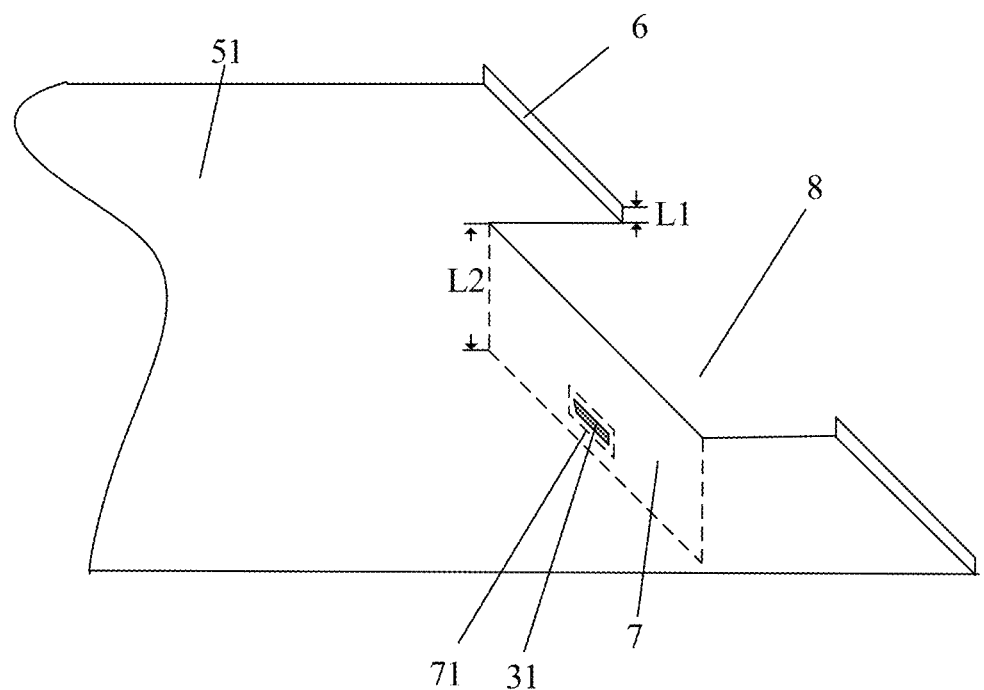
FIG. 3a is a stereoscopically schematic view illustrating a backlight structure according to the embodiments of the present disclosure.
Figure 3B:
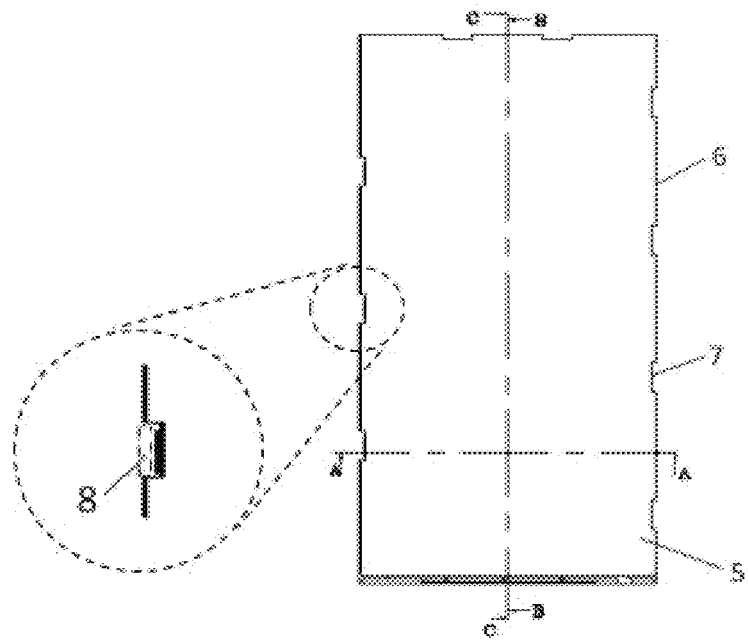
FIG. 3b is a planar schematic view illustrating the backlight structure according to the embodiments of the present disclosure.
Figure 3C:
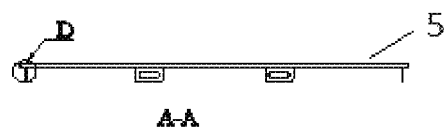
FIG. 3c is a sectional view of the backlight structure of FIG. 3b taken along a line A-A.
Figure 3D:
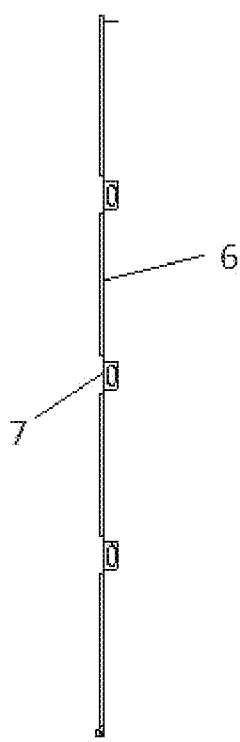
FIG. 3d is a sectional view of the backlight structure of FIG. 3b taken along a line B-B.
Figure 3E:
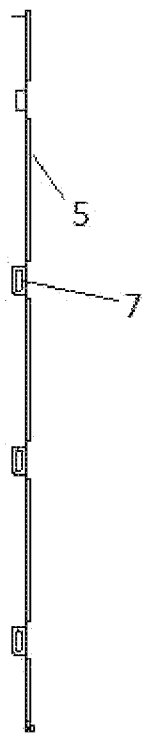
FIG. 3e is a sectional view of the backlight structure of FIG. 3b taken along a line C-C.

FIG. 2 is a structurally schematic view illustrating a display device according to embodiments of the present disclosure, FIG. 3a is a stereoscopically schematic view illustrating a backlight structure according to the embodiments of the present disclosure, FIG. 3b is a planar schematic view illustrating the backlight structure according to the embodiments of the present disclosure; FIG. 3c is a sectional view of the backlight structure of FIG. 3b taken along a line A-A, FIG. 3d is a sectional view of the backlight structure of FIG. 3b taken along a line B-B, and FIG. 3e is a sectional view of the backlight structure of FIG. 3b taken along a line C-C. The display device according to the embodiments of the present disclosure includes a backlight structure comprising a frame 5. For example, the frame 5 includes: a main body 51, for example, which is uniform in thickness and of a plate shape; a first bending portion 6 protruding from the main body 51 in a first direction, for accommodating a liquid crystal display module 2; and a second bending portion 7 protruding from the main body 51 in a second direction, which is fixedly connected with a middle shell 3, and the first direction and the second direction are opposite to each other. For example, each of the first direction and the second direction is substantially perpendicular to the main body 51. Because the second bending portion 7 is fixedly connected to the middle shell 3, it is unnecessary to perform an adhesive dispensing step in the embodiments of the present disclosure, and further a gap of approximately 0.3 mm does not occur. As a result, the display device with a large screen-to-body ratio and being ultra-thin is obtained.

For example, the second bending portion 7 is an integral structure formed of rubber and iron. For example, the second bending portion 7 is connected to the middle shell 3 in a snap-fit manner. For example, an opening or a protrusion 71 is arranged at an end of the second bending portion 7 facing away from the main body 51, and a protrusion or an opening 31 is provided at a position of the middle shell 3 corresponding to the opening or the protrusion 71, thereby realizing the snap-fit connection between the second bending portion 7 and the middle shell 3. For example, the second bending portion and the middle shell 3 are fixedly connected by other manners, such as riveting, etc., and embodiments of the present disclosure do not place limitation on this.

As mentioned above, the first bending portion 6 is used to accommodate the liquid crystal display module 2, and the second bending portion 7 needs to be fixedly connected to the middle shell 3. In order that the first bending portion 6 and the second bending portion 7 respectively achieve their functions without increasing the overall thickness of the display device, for example, a length L2 of the second bending portion 7 in the second direction is greater than a length L1 of the first bending portion 6 in the first direction.

For example, the frame 5 is of a rectangle, and the first bending portion 6 and the second bending portion 7 are disposed at at least one edge of the frame 5, and are arranged alternately. For example, in the embodiments of the present disclosure, the first bending portion 6 and the second bending portion 7 are disposed at each of three edges of the frame 5. For example, the backlight structure is of a side-input type and includes a light source, and the first bending portion 6 and the second bending portion 7 are not provided at an edge, where the light source is arranged, of the frame 5.

For example, further referring to FIG. 2, the display device includes a display module 2 and a shell except that it includes the above backlight structure. For example, the display module 2 is arranged on the backlight structure in the first direction, the shell includes a rear shell 4 and a middle shell 3 located on an inner side of the rear shell 4, the backlight structure is arranged on the middle shell 3 in the first direction, and the second bending portion 7 is fixedly connected to the middle shell 3.

For example, further referring to FIG. 2, the rear shell 4 includes a main body 41 and a bending portion 42, the main body 41 of the rear shell 4 is parallel to the main body 51 of the frame of the backlight structure, and the bending portion 42 of the rear shell 4 protrudes from the main body 41 of the rear shell 4 in the first direction.

For example, referring to FIG. 2 continually, the rear shell 4 further includes a protruding portion 43 that protrudes from the bending portion 41 of the rear shell 4 to an inner side of the display device. The protruding portion 43 is parallel to the main body 41 of the rear shell 4, and for example, the protruding portion 43 supports other component. For example, in order to reduce the difficulty of fabrication and installation, the second extending section 7 and the middle shell 3 are separated from the protruding portion 43 by a distance d.

Figure 4:
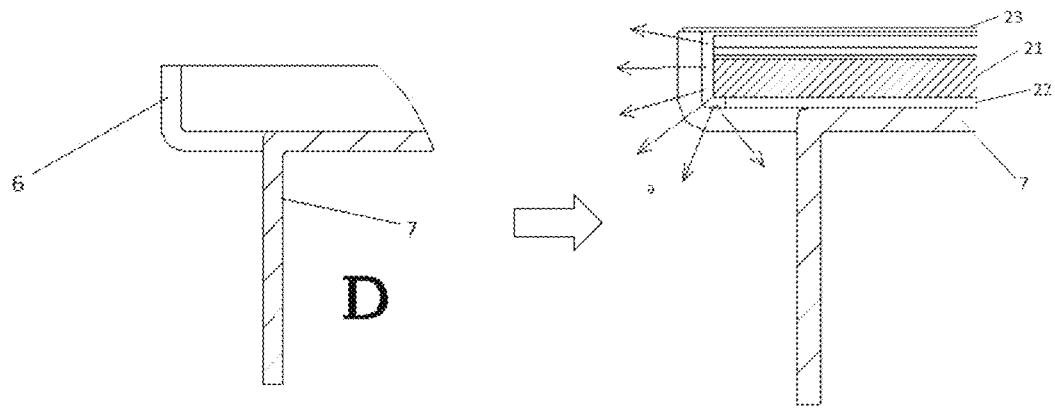
FIG. 4 is an enlarged view of a section D of the backlight structure of FIG. 3c, in which light leakage of the backlight structure occurs.

For example, the second bending portion 7 is located between two adjacent first bending portions 6. For example, the frame 5 further has a hollow portion 8, which is located between the two adjacent first bending portions 6 and further extends to a position where the second bending portion 7 intersects with the main body 51. As shown in FIG. 3a, because the second bending portion 7 is formed by bending, the hollow portion 8 is formed between the two adjacent second bending portions 6 and further in a plane in which the main body 51 is located. For example, as shown in FIG. 3a, a portion of the hollow portion 8 is located in the plane in which the main body 51 is located, so that the position where the second bending portion 7 intersects with the main body 51 is recessed to an inner side of the main body 51 as compared to a position where the two adjacent first bending portions 6 intersect with the main body 51. In the embodiments of the present disclosure, referring to FIG. 4 to be described below, the backlight structure further includes a light guide plate 21 and a reflective plate 22. The display module 2 is, for example, a liquid crystal display module and includes at least a screen 23. The light guide plate 21 and the reflective plate 22 are sequentially disposed under the screen 23; that is, in the first direction, the reflective plate 22 is arranged on the main body 51, the light guide plate 21 is arranged on the reflective plate 22, and the display module 2 is arranged on the light guide plate 21. As shown in FIG. 4, after the light guide plate 21, the reflective plate 22 and the screen 23 are placed on the main body 51, a part of light from the light guide plate 21 goes through the hollow portion 8 and is emitted from the backlight structure along directions of a, as denoted by arrows in FIG. 4, and in this case light leakage occurs and the light leakage greatly reduces the display effect.

Figure 5:
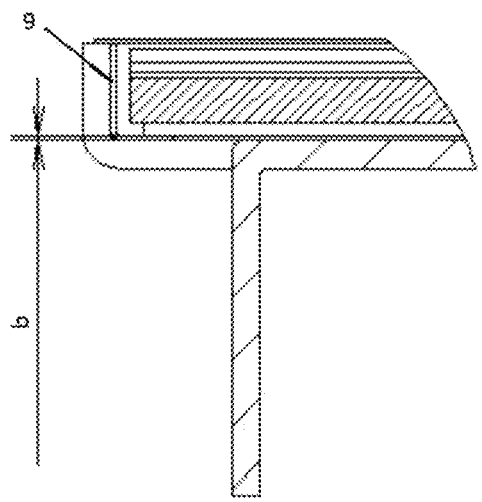
FIG. 5 is a structurally schematic view illustrating an adhesive tape used in the backlight structure of FIG. 4.
Figure 6:
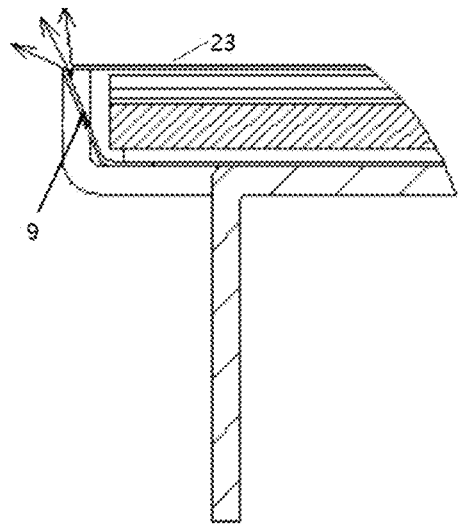
FIG. 6 is a structurally schematic view illustrating displacement of the adhesive tape in FIG. 5 and occurrence of light leakage.

In order to solve the above problem of light leakage, as shown in FIG. 5, for example, one end of an adhesive tape 9 is attached between the reflective plate 22 and the main body 51, and the other end of the adhesive tape 9 is bent along an outline of the first bending portion 6 and is attached to an inner surface of the first bending portion 6. However, because the adhesive tape 9 is relatively soft, the overall firmness is not strong, and the adhesive tape 9 cannot keep its shape for a long time. Therefore, the adhesive tape 9 is very easy to get out of its place in real products, that is, the adhesive tape 9 is exposed outside or arched outwardly (see FIG. 6), and thus the problem of light leakage of the display device cannot be solved for a long time.

In addition, because the adhesive tape 9 is provided additionally on the inner surface of the first bending portion 6 and the adhesive tape 9 has a thickness of b, the adhesive tape 9 increases overall thickness of the backlight structure 5, and the ultra-thin display device cannot be obtained.

Figure 7:
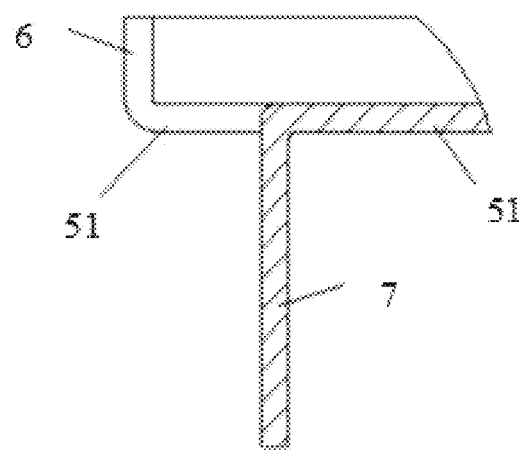
FIG. 7 is a structurally schematic view illustrating a case where no light shading adhesive is added to a hollow portion of the backlight structure according to the embodiments of the present disclosure.
Figure 8A:
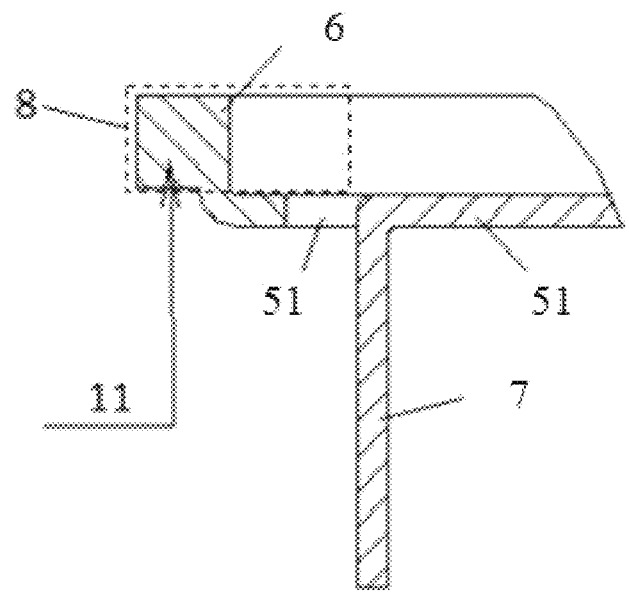
FIG. 8a is a structurally sectional view illustrating a case where a light shading adhesive is added to the hollow portion of the backlight structure according to the embodiments of the present disclosure.
Figure 8B:
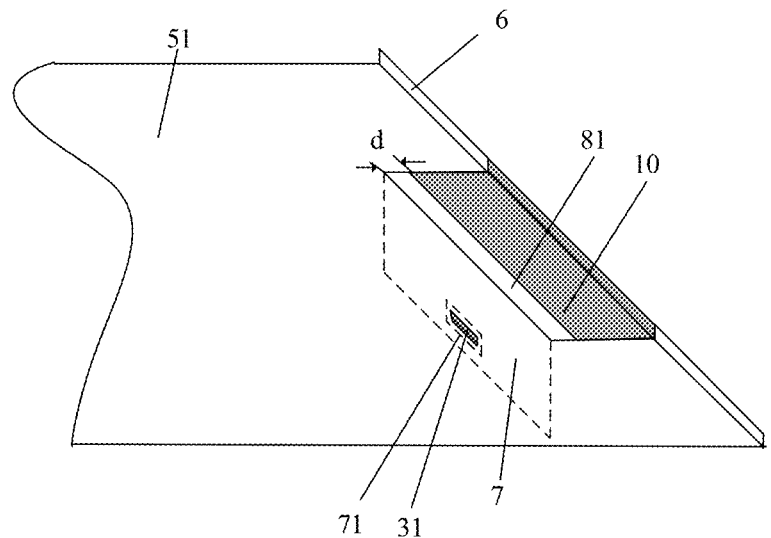
FIG. 8b is a stereoscopically schematic view illustrating the case where the light shading adhesive is added to the hollow portion of the backlight structure according to the embodiments of the present disclosure.
Figure 8C:
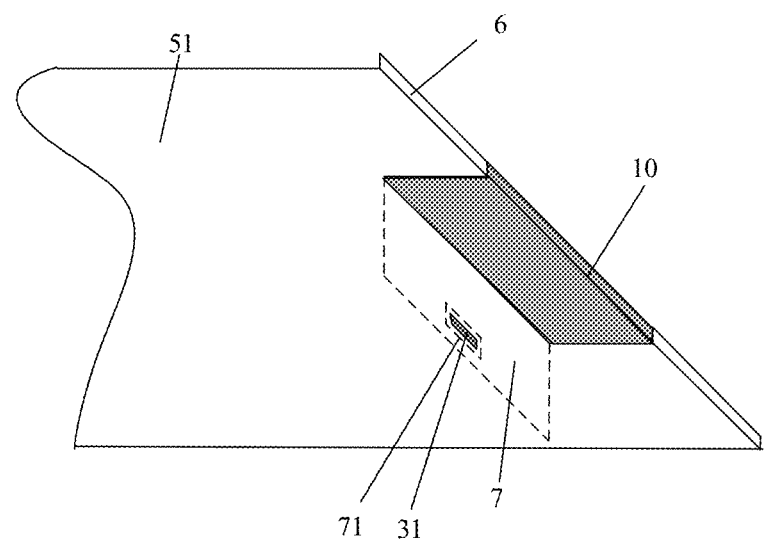
FIG. 8c is another stereoscopically schematic view illustrating the case where the light shading adhesive is added to the hollow portion of the backlight structure according to the embodiments of the present disclosure.

In order to solve the above problems, the backlight structure is further optimized in the embodiments of the present disclosure, for the sake of reducing the thickness of the display device and improving the light shading effect and firmness of the overall structure. FIG. 7 is a structurally schematic view illustrating the case where no light shading adhesive is added to the hollow portion of the backlight structure according to the embodiments of the present disclosure, FIG. 8a is a schematically sectional view illustrating the case where a light shading adhesive is added to the hollow portion of the backlight structure according to the embodiments of the present disclosure, FIG. 8b is a stereoscopically schematic view illustrating the case where the light shading adhesive is added to the hollow portion of the backlight structure according to the embodiments of the present disclosure, and FIG. 8c is another stereoscopically schematic view illustrating the case where the light shading adhesive is added to the hollow portion of the backlight structure according to the embodiments of the present disclosure. For example, the backlight structure includes the frame 5 and a light shading member 10, and the frame 5 includes at least one first bending portion 6 and at least one second bending portion 7. The first bending portion 6 is used for accommodating the light guide plate 21 and the reflective plate 22. The second bending portion 7 is located between two adjacent first bending portions 6, and the hollow portion 8 is located between the two adjacent first bending portions 6 and further extends to the position where the second bending portion 7 intersects with the main body 51. For example, the light shading member 10 is filled within the hollow portion 8, for the purpose of preventing the above-described light leakage.

Because the light shading member 10 is filled within the hollow portion 8, the need to add the adhesive tape in the display device is eliminated, and the overall thickness of the display device is reduced.

For example, the frame 5 is of the rectangle, and the two adjacent first bending portions 6 and the second bending portion 7 located between the two adjacent first bending portions 6 are arranged at at least one edge of the frame 5. For example, the two adjacent first bending portions 6 and the second bending portion 7 located between the two adjacent first bending portions 6 are arranged at each of three edges of the frame 5, so that thickness of the backlight module is further reduced, and moreover, the screen-to-body ratio of the screen is increased in light of the fact that the glue dispensing is not needed. For example, at the edge, where the light source is provided, of the frame 5, the first bending portion 6 and the second bending portion 7 are not provided.

For example, the light shading member 10 is a light shading adhesive, which is filled within the hollow portion 8 in a manner of injection molding.

For example, referring to FIG. 2, the display device further includes an adhesive layer 25, a first side of the adhesive layer 25 is connected to the bending portion 42 of the rear shell 4, and a second side of the adhesive layer 25 is connected to the light shading member 10, and the first side and the second side are opposite sides. That is, the light shading member 10 is connected not only to the first bending portion 6, but also to the shell by aid of the adhesive layer 25. Therefore, the light shading member 10 does not undergo displacement even being used for a long time, and the light shielding effect is improved. Consequently, according to the embodiments of the present disclosure, not only the thickness of the display device is reduced, but also the light shielding effect and the overall firmness are improved.

For example, as shown in FIG. 8a to FIG. 8c, in view of the fact that a portion of the hollow portion 8 is located within the plane in which the body 51 is located, a portion of the light shading member 10 is also located within the plane in which the main body 51 is located for the sake of preventing light leakage at the hollow portion 8. Further, for example, as shown in FIG. 8a to FIG. 8c, the portion of the light shading member 10 located within the plane in which the main body 51 is located is flush with the main body 51 in the first direction and in the second direction, respectively, so as to avoid thicknesses of the backlight structure and the display device from being increased.

For example, as shown in FIG. 8b, the light shading member 10 is filled within a preset region of the hollow portion 8, and in this case, a gap 81 is between the portion of the light shading member 10 located within the plane in which the main body 51 is located and the position where the second bending portion 7 intersects with the main body 51. The gap 81 is a part of the hollow portion 8, and is covered by the reflective plate 22. Because the reflective plate 22 covers the gap 81, light does not leak from the gap 81. For the structure shown in FIG. 8b, because the light shading member 10 does not need to completely cover the portion of the hollow portion 8 located within the plane in which the main body 51 is located, the fabrication difficulty is reduced and a larger process margin is achieved.

For example, as shown in FIG. 8c, the light shading member 10 is filled within an entirety of the hollow portion 8, and in this case, the portion of the light shading member 10 located within the plane in which the main body 51 is located extends to the position where the second bend section 7 intersects with the main body 51, so as to completely cover the portion of the hollow portion 8 located within the plane in which the main body 51 is located.

For example, as shown in FIG. 8b and FIG. 8c, a portion of the light shading member 10 is located between the two adjacent first bending portions 6 and is flush with the two adjacent first bending portions 6 in the first direction, so as to avoid thicknesses of the backlight structure and the display device from being increased at the time of preventing light leakage. For example, the portion of the light shading member 10 located between the two adjacent first bending portions 6 is connected to the two adjacent first bending portions 6, respectively.

Figure 9:
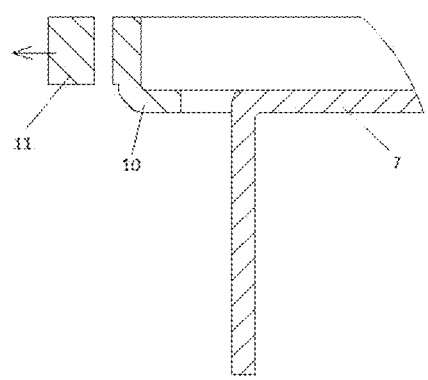
FIG. 9 is a structurally schematic view illustrating removal of an excess portion of the light shading adhesive in FIG. 8 according to the embodiments of the present disclosure.
Figure 10:
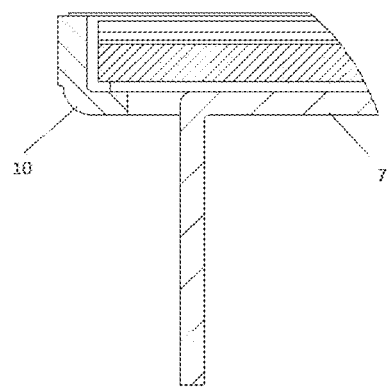
FIG. 10 is a structurally schematic view illustrating that a display module is provided on the backlight structure of FIG. 9.

In the process of manufacturing the frame 5 of the backlight structure according to the embodiments of the present disclosure, the inventor finds that, due to the process limitations and the small thickness of the first bending portions 6, an excess portion 11 of the light shading adhesive is provided on an outer side of the frame 5. In order to solve the above technical problem, as shown in FIG. 9 and FIG. 10, the light shading adhesive is thinned after the light shading adhesive is filled into the hollow portion 8, and for example, the excess portion 11 of the light shading adhesive is removed by means of polishing. For example, during removal of the excess portion 11 of the light shading adhesive, an entirety of the excess portion 11, provided on the outer side of the frame 5, of the light shading adhesive is removed. In an actual production process, due to limitations of the production process and the like, a portion of the excess portion 11, provided on the outer side of the frame 5, of the light shading adhesive may be retained during polishing. Therefore, in the embodiments of the present disclosure, the thickness of the light shading member 10 is substantially equal to the thickness of the frame 5. For example, the thickness of the portion, located between the two adjacent first bending portions 6, of the light shading member 10 is substantially equal to the thickness of the two adjacent first bending portions 6. After that, the light guide plate 21 and the reflective plate 22 are provided within the first bending portions 6.

According to the embodiments of the present disclosure, a display device is further provided, and the display device includes the backlight structure, the display module and the shell as described above. Owing to the improvements of the backlight structure, the display device has thinner thickness and stable structure. For details of the display device, reference may be made to the above descriptions, which will not be elaborated here. For example, the display module is located within the first bending portions 6 by means of adhesion using a bottom adhesive, and the second bending portion 7 is fixed to the shell by mean of snap-fitting. For example, the display device is a liquid crystal display device.

According to the embodiments of the present disclosure, a mobile terminal is further provided, and the mobile terminal includes the display device as described above. For example, the mobile terminal is a mobile phone, an electronic photo frame, etc.

Figure 11:
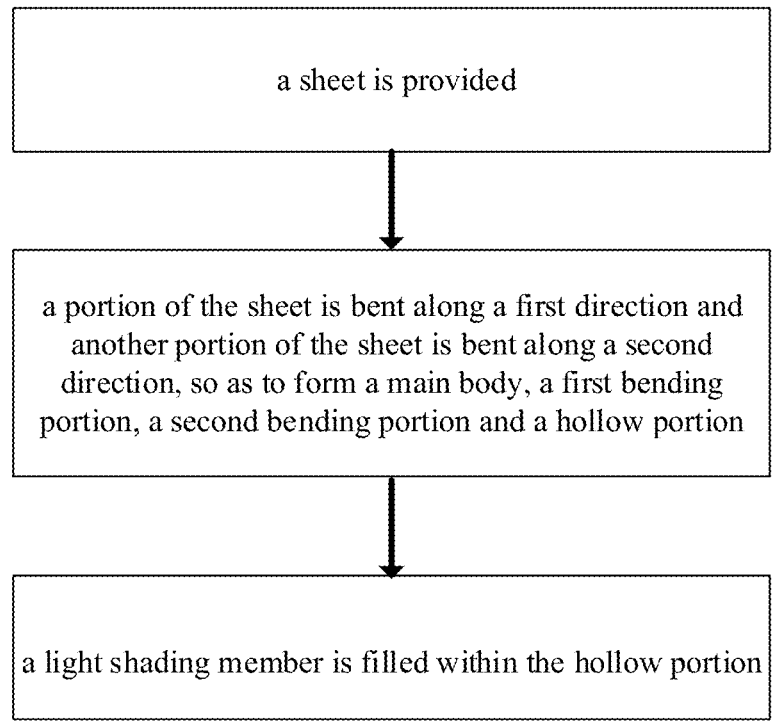
FIG. 11 is a flowchart illustrating a manufacturing method of a backlight structure according to the embodiments of the present disclosure.

According to the embodiments of the present disclosure, a manufacturing method of a backlight structure is further provided. For example, the backlight structure includes the frame 5 and the light shading member 10, and the frame 5 includes the main body 51, the first bending portion 6, the second bending portion 7, and the hollow portion 8. For example, as shown in FIG. 11, the method includes, with reference to FIG. 12, providing a sheet 50, and for example, the sheet 50 is an integral structure formed of rubber and iron. Referring to FIG. 3a, a portion of the sheet 50 is bent in the first direction and another portion of the sheet 50 is bent in the second direction, so as to form the main body 51, the first bending portion 6, the second bending portion 7 and the hollow portion, and the first direction is opposite to the second direction. The first bending portion 6 protrudes from the main body 51 in the first direction, the second bending portion 7 protrudes from the main body 51 in the second direction, the second bending portion 7 is located between two adjacent first bending portions 6, and the hollow portion 8 is located between the two adjacent first bending portions 6 and further extends to the position where the second bending portion 7 intersects with the main body 51. With reference to FIG. 8a to FIG. 8C, the light shading member 10 is formed within the hollow portions 8.

For example, the light shading member 10 is the light shading adhesive, and the light shading member 10 is filled into the hollow portions 8 by injection molding.

Figure 12:
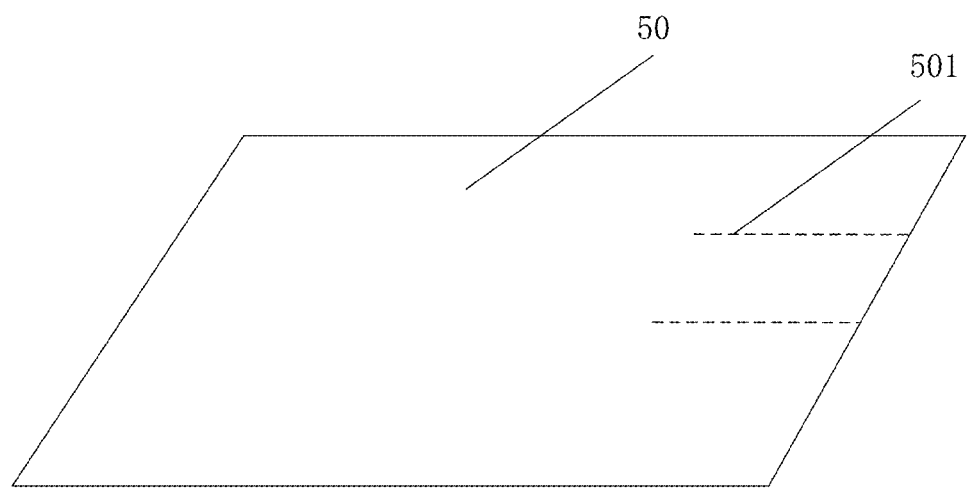
FIG. 12 is a schematic view illustrating a sheet used in the manufacturing method of the backlight structure according to the embodiments of the present disclosure.

For example, as shown in FIG. 12, before the portion of the sheet 50 is bent in the first direction and the another portion of the sheet 50 is bent in the second direction, the method further includes cutting the sheet 50 along a cutting line 501, which is located between the portion of the sheet 50 and the another portion of the sheet 50. Thus, the first bending portions 6 and the second bending portions 7 are readily available.

For example, as shown in FIG. 9 and FIG. 10, after the light shading member 10 is filled into the hollow portions 8 by injection molding, the method further includes thinning the light shading member 10. Thus, at the time of preventing light leakage, it is possible to avoid the thicknesses of the backlight structure and the display device from being increased and to avoid the screen-to-body ratio from being increased.

The foregoing embodiments merely are exemplary embodiments of the disclosure, and not intended to define the scope of the disclosure, and the scope of the disclosure is determined by the appended claims.

What is claimed is:

1. A backlight structure, comprising a frame and a light shading member, wherein
the frame comprises a main body, a first bending portion and a second bending portion, the first bending portion protrudes from the main body in a first direction, the second bending portion protrudes from the main body in a second direction, the first direction is opposite to the second direction, the second bending portion is located between two adjacent first bending portions,
the frame further comprises a hollow portion, the hollow portion is located between the two adjacent first bending portions and further extends to a position where the second bending portion intersects with the main body, and
the light shading member is located within the hollow portion.

2. The backlight structure according to claim 1, wherein a portion of the hollow portion is located within a plane in which the main body is located, so that the position where the second bending portion intersects with the main body is recessed into an inner side of the main body as compared to a position where the two adjacent first bending portions intersect with the main body.

3. The backlight structure according to claim 2, wherein a portion of the light shading member is located within the plane in which the main body is located and is flush with the main body in the first direction and the second direction, respectively.

4. The backlight structure according to claim 3, wherein the portion of the light shading member located within the plane in which the main body is located extends to the position where the second bending portion intersects with the main body.

5. The backlight structure according to claim 3, further comprising a reflective plate disposed on the main body and a light guide plate disposed on the reflective plate in the first direction, wherein
a gap is between the portion of the light shading member located within the plane in which the main body is located and the position where the second bending portion intersects with the main body, the gap is a part of the hollow portion, and the gap is covered by the reflective plate.

6. The backlight structure according to claim 1, wherein a portion of the light shading member is located between the two adjacent first bending portions, and is flush with the two adjacent first bending portions in the first direction.

7. The backlight structure according to claim 6, wherein a thickness of the portion of the light shading member located between the two adjacent first bending portions is substantially equal to a thickness of the two adjacent first bending portions.

8. The backlight structure according to claim 1, wherein each of the first direction and the second direction is substantially perpendicular to the main body.

9. The backlight structure according to claim 1, wherein a length of the second bending portion in the second direction is greater than a length of the first bending portion in the first direction.

10. The backlight structure according to claim 1, wherein an end, facing away from the main body, of the second bending portion, is provided with an opening or a protrusion.

11. The backlight structure according to claim 1, wherein the frame is of a rectangle, and the two adjacent first bending portions and the second bending portion are arranged at at least one edge of the frame.

12. A display device, comprising the backlight structure according to claim 1, a display module and a shell, wherein
the display module is disposed on the backlight structure in the first direction,
the shell includes a rear shell and a middle shell located on an inner side of the rear shell, the backlight structure is disposed on the middle shell in the first direction, and the second bending portion is fixed to the middle shell.

13. The display device according to claim 12, further comprising an adhesive layer, wherein
the rear shell includes a main body and a bending portion, the main body of the rear shell is parallel to the main body of the frame, the bending portion of the rear shell protrudes from the main body of the rear shell in the first direction,
a first side of the adhesive layer is connected to the bending portion of the rear shell, a second side of the adhesive layer is connected to the light shading member, and the first side and the second side are opposite sides.

14. The display device according to claim 12, wherein
the rear shell further includes a protruding portion protruding from the bending portion of the rear shell to an inner side of the display device, the protruding portion is parallel to the main body of the rear shell, and
the second bending portion and the middle shell are separated from the protruding portion by a distance.

15. A mobile terminal, comprising the display device according to claim 12.

16. A manufacturing method of a backlight structure, the backlight structure comprising a frame and a light shading member, the frame comprising a main body, a first bending portion, a second bending portion and a hollow portion, wherein
the method comprises:
providing a sheet;
bending a portion of the sheet in a first direction and bending another portion of the sheet in a second direction, so as to form the main body, the first bending portion, the second bending portion and the hollow portion, in which the first direction is opposite to the second direction, the first bending portion protrudes from the main body in the first direction, the second bending portion protrudes from the main body in the second direction, the second bending portion is located between two adjacent first bending portions, and the hollow portion is located between the two adjacent first bending portions and further extends to a position where the second bending portion intersects with the main body; and
forming a light shading member within the hollow portion.

17. The manufacturing method according to claim 16, wherein the light shading member is a light shading adhesive, and the light shading member is filled into the hollow portion by injection molding.

18. The manufacturing method according to claim 16, wherein before the portion of the sheet is bent in the first direction and the another portion of the sheet is bent in the second direction, the method further comprises:
cutting the sheet along a cutting line, in which the cutting line is located between the portion of the sheet and the another portion of the sheet.

19. The manufacturing method according to claim 17, wherein after the light shading member is filled into the hollow portion by injection molding, the method further comprises thinning the light shading member.

20. The backlight structure according to claim 11, further comprising a light source provided at an edge of the frame, wherein the first bending portion and the second bending portion are not provided at the edge, where the light source is provided, of the frame.

* * * * *